(12) United States Patent
Hasegawa et al.

(10) Patent No.: US 6,853,678 B2
(45) Date of Patent: Feb. 8, 2005

(54) SYNCHRONIZING CIRCUIT

(75) Inventors: Shigekatsu Hasegawa, Chofu (JP); Naoto Endo, Chofu (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 738 days.

(21) Appl. No.: 09/761,092

(22) Filed: Jan. 16, 2001

(65) Prior Publication Data

US 2001/0012318 A1 Aug. 9, 2001

(30) Foreign Application Priority Data

Feb. 2, 2000 (JP) .................................... 2000-025771

(51) Int. Cl.[7] .............................................. H04L 7/00
(52) U.S. Cl. .................... 375/150; 375/343; 375/367; 370/515; 370/208
(58) Field of Search ................. 375/148–150, 375/343, 376, 142–143, 152, 47; 342/357.04, 357.06, 357.12, 352, 383; 701/213; 702/149; 379/208–209, 320, 335, 342, 515; 708/410, 422, 426

(56) References Cited

U.S. PATENT DOCUMENTS 6,160,841 A  * 12/2000  Stansell et al. ............. 375/148

* cited by examiner

Primary Examiner—Young T. Tse
Assistant Examiner—Edith Chang
(74) Attorney, Agent, or Firm—Ladas & Parry LLP

(57) ABSTRACT

A synchronizing circuit synchronizes a predetermined code with first and second codes different in phase, include: a code generating part outputting phase-shifted code shifted in phase by a predetermined number of chips from the predetermined code; a first correlation detecting part detecting a correlation between the phase-shifted code from the code generating part and the first code; a second correlation detecting part detecting a correlation between the phase-shifted code from the code generating part and the second code; and a code shifting part shifting the phase of the phase-shifted code from the code generating part by a predetermined number of chips according to the detection results of the first and second correlation detecting parts.

2 Claims, 6 Drawing Sheets

SYNCHRONIZING CIRCUIT

BACKGROUND OF THE INVENTION

1. Field of the Invention

The present invention relates to a synchronizing circuit which renders a synchronization between externally provided codes and internal codes.

2. Description of the Related Art

FIG. 1 shows a block configuration of one exmaple of a GPS receiving apparatus in the related art.

The GPS receiving apparatus 1 shown in the figure includes a receiving antenna 3, a receiving unit 4, an information processing device 5 and a display device 5.

The receiving antenna 2 receives GPS signals from GPS satellites 2-1 through 2-n. The GPS signals are signals of 1575.42 MHz. The GPS signals received by the receiving antenna 2 are provided to the receiving unit 4.

The receiving unit 4 extracts C/A codes (pseudo-random codes) from the GPS signals, and outputs data according to time difference between different C/A codes. The data output from the receiving unit 4 is provided to the information processing device 5.

The information processing device 5, according to the output data of the receiving unit 4, obtains information of latitude, longitude, altitude, time and so forth. The information processing device 5, accordintg to the thus-obtained information, drives the display device 6. The display device 6 displays the information of latitude, longitude, altitude, time and so forth obtained by the information processing device 4.

The receiving unit 4 will now be described.

FIG. 2 shows a block configuration of the receiving unit 4 shown in FIG. 1.

The receiving unit 4 includes a radio-frequency circuit 11, a receiving circuit 12, a CPU 13 and a RAM 14.

A received signal is provided to the radio-frequency circuit 11 from the antenna 3. The radio-frequency circuit 11 renders frequency conversion on the thus-provided received signal into a signal in a predetermined frequency band.

FIG. 3 shows a block configuration of the radio-frequency circuit 11.

The radio-frequency circuit 11 includes frequency converting parts 21 and 22, and an oscillating circuit 23. An oscillation signal of 18.414 MHz is provided to the oscillating circuit 23 from the receiving circuit 12. The oscillating circuit 23 includes a PLL (Phase Locked Loop) circuit, generates an oscillation signal of 1555.983 MHz from the thus-provided oscillation signal of 18.414 MHz, and provides the thus-generated signal to the frequency converting part 21.

The received signal having a carrier frequency of 1575.42 MHz is provided to the frequency converting circuit 21 from the antenna 3, and also, the oscillation signal of 1555.983 MHz is provided to the frequency converting circuit 21 from the oscillating circuit 23. The frequency converting part 21 multiplies the received signal with the oscillation signal of 1555.983 MHz, and converts the carrier frequency of the received signal into 19.437 MHz.

The received signal having thus undergone the frequency conversion by the frequency converting circuit 21 is provided to the frequency converting circuit 22. The oscillation signal of 18.414 MHz is provided to the frequency converting circuit 22 from the receiving circuit 12. The frequency converting circuit 22 multiplies the received signal from the frequency converting circuit 21 with the oscillation signal from the receiving circuit 12, and converts the received signal into a signal having a carrier frequency of 1.023 MHz. The signal obtained through the conversion by the frequency converting circuit 22 is provided to the receiving circuit 12.

The receiving circuit 12 extracts a satellite code according to the signal provided from the radio-frequency circuit 11.

FIG. 4 shows a block configuration of the receiving circuit 12.

The receiving circuit 12 includes a C/A-code generating circuit 31, multipliers 32 through 37, an oscillating circuit 38, a first detecting circuit 39, a second detecting circuit 40, a third detecting circuit 41 and a fourth detecting circuit 42.

The signal from the radio-frequency circuit 11 is provided to the multipliers 32 and 33. The multipliers 32 and 33 are connected to the oscillating circuit 38. The oscillating circuit 38 provides an oscillation signal accordintg to a carrier frequency of an I-signal to the multiplier 32, and provides an oscillation signal accordintg to a carrier-frequency of a Q-signal to the multiplier 33. The phase of the oscillating circuit 38 is controlled by a control signal from the CPU 13.

The C/A-code generating circuit 31 generates 3 types of C/A codes in timing according to the control signal from the CPU 13. The three types of C/A codes are a 0-chip delayed C/A code without delay, a −½-chip delayed C/A code having a delay of −½ chip from the 0-chip delayed C/A code, and a +½-chip delayed C/A code having a delay of +½ chip from the 0-chip delayed C/A code. The term 'chip' is a special term in the GPS technical field, and means a unit of a signal when the signal is divided in time axis.

The multiplier 32 multiplies the signal from the radio-frequency circuit 11 with the occultation signal from the oscillating circuit 38, and extracts the I-signal. The multiplier 33 multiplies the signal from the radio-frequency circuit 11 with the occultation signal from the oscillating circuit 38, and extracts the Q-signal.

The I-signal extracted by the multiplier 32 is provided to the multipliers 34 through 36. The I-signal is provided to the multiplier 34 from the multiplier 32, and, also, the −½-chip delayed C/A code is provided to the multiplier 34 from the C/A-code generating circuit 31. The multiplier 34 multiples the I-signal with the −½-chip delayed C/A code.

The I-signal is provided to the multiplier 35 from the multiplier 32, and, also, the 0-chip delayed C/A code is provided to the multiplier 35 from the C/A-code generating circuit 31. The multiplier 35 multiples the I-signal with the 0-chip delayed C/A code.

The I-signal is provided to the multiplier 36 from the multiplier 32, and, also, the +½-chip delayed C/A code is provided to the multiplier 36 from the C/A-code generating circuit 31. The multiplier 36 multiples the I-signal with the +½-chip delayed C/A code.

The Q-signal is provided to the multiplier 37 from the multiplier 33, and, also, the 0-chip delayed C/A code is provided to the multiplier 37 from the C/A-code generating circuit 31. The multiplier 37 multiples the Q-signal with the 0-chip delayed C/A code.

The multiplication result of the multiplier 34 is provided to the first detecting circuit 39. The multiplication result of the multiplier 35 is provided to the second detecting circuit 40. The multiplication result of the multiplier 36 is provided to the third detecting circuit 41. The multiplication result of the multiplier 37 is provided to the fourth detecting circuit 42.

The first detecting circuit 39 counts, from the multiplication result of the multiplier 34, chips in disagreement between the −½-chip delayed C/A code and I-signal, and, outputs the thus-obtained count value C1. The second detecting circuit 40 counts, from the multiplication result of the multiplier 35, chips in disagreement between the 0-chip delayed C/A code and I-signal, and, outputs the thus-obtained count value C2. The third detecting circuit 41 counts, from the multiplication result of the multiplier 36, chips in disagreement between the +½-chip delayed C/A code and I-signal, and, outputs the thus-obtained count value C3. The fourth detecting circuit 42 counts, from the multiplication result of the multiplier 37, chips in disagreement between the 0-chip delayed C/A code and Q-signal, and, outputs the thus-obtained count value C4.

The count values C1, C2, C3 and C4 output from the first through fourth detecting circuits 39 through 42 are provided to the CPU 13.

The CPU 13 obtains correlation values b1 through b4 from the count values C1 through C4. The correlation value b1 is a correlation value between the I-signal and −½-chip delayed C/A code. The correlation value b2 is a correlation value between the I-signal and 0-chip delayed C/A code. The correlation value b3 is a correlation value between the I-signal and +½-chip delayed C/A code. The correlation value b4 is a correlation value between the Q-signal and 0-chip delayed C/A code.

The correlation values b1 through b4 are obtained by the following formulas assuming that the count value in a case where there is no correlation is 'a':

$$b1 = C1 - a \quad (1)$$

$$b2 = C2 - a \quad (2)$$

$$b3 = C3 - a \quad (3)$$

$$b4 = C4 - a \quad (4)$$

The CPU 13 obtains a correlation d0 between the I-signal and Q-signal, and the internally generated code from the correlation value b2 and correlation b4 by the following formula (5):

$$d0 = (b2^2 + b4^2) \quad (5)$$

The CPU 13 compares the correlation d0 with a threshold. When the correlation d0 is smaller than the threshold (this means that the correlation between the received signal and internally generated code is small) and also the phase shift amount has reached 1023 chips (a condition in which it is determined that the frequency difference is so large that the predetermined correlation cannot be obtained therebetween although the phase is shifted through the maximum range), the CPU 13 provides a frequency control signal to the oscillating circuit 38. The oscillating circuit 38 controls the frequency of the oscillation signal provided to the multipliers 32 and 33 accordintg to the frequency control signal from the CPU 13. The CPU 13 repeats the above-mentioned operation until the correlation d0 exceeds the threshold (the phase difference therebetween becomes sufficiently small).

When the correlation d0 exceeds the threshold, the CPU 13 performs a lock operation. The lock operation is such that CPU 13 controls the oscillating circuit 38 according to the correlation d0, and monitors the correlation between the I-signal and Q-signal, and the internally generated code. The correlation d0 between the I-signal and Q-signal, and the internally generated code is provided to the information processing device 5.

The information processing device 5 renders a synchronization with the signal from the satellite by using the correlation d0 between the I-signal and Q-signal, and the internally generated code provided from the CPU 13, obtains information therefrom, and extracts position information therefrom. A map is displayed by the display device 6, and, a position according to the thus-extracted position information is displayed on the thus-displayed map. Further, the CPU 13 performs the lock operation according to the correlation value b1 and correlation value b3. With regard to the principle and so forth for obtaining position information and so forth from the GPS signal (signal from satellites), they are well known in the GPS technical field, and detailed description thereof is omitted.

However, in such a search method in the related art, only the correlation between one pair of 0-chip delay of I-signal and 0-chip delay of Q-signal is utilized. Accordingly, the C/A-code can be shifted only by one chip every time in the search operation.

Thereby, a considerable time is required for the search.

SUMMARY OF THE INVENTION

An object of the present invention is to provide a synchronizing circuit by which it is possible to render a synchronization at high speed with a simple configuration.

A synchronizing circuit synchronizing a predetermined code (0-chip delayed C/A code) with first and second codes (I-signal and Q-signal) different in phase, according to the present invention, includes:

a code generating part (31') outputting phase-shifted code (−1-chip delayed C/A code) shifted in phase by a predetermined number (−1) of chips from the predetermined code;

a first correlation detecting part (34, 39) detecting a correlation between the phase-shifted code (−1-chip delayed C/A code) from the code generating part (31') and the first code (I-signal);

a second correlation detecting part (36, 41) detecting a correlation between the phase-shifted code (−1-chip delayed C/A code) from the code generating part and the second code (Q-signal); and a code shifting part (13) shifting the phase of the code (0-chip delayed C/A code, −1-chip delayed C/A code, −½-chip delayed C/A code and +½-chip delayed C/A code) generated from the code generating part (31') by a predetermined number (2) of chips according to the detection results of the first and second correlation detecting parts (34, 36, 39, 42).

The first and second codes (I-signal and Q-signal) may be different in phase by ½ chips; and the code generating part (31') may generate the phase-shifted code (−1-chip delayed C/A code) shifted in phase by one chip from the predetermined code (0-chip delayed C/A code).

The circuit may further include:

a third correlation detecting part (35, 40) detecting a correlation between the predetermined code (0-chip delayed C/A code) and the first code (I-signal); and a fourth correlation detecting part (37, 42) detecting a correlation between the predetermined code (0-chip delayed C/A code) and the second code (Q-signal).

The code generating part may further generates first and second fraction-shifted codes (−½-chip delayed C/A code and +½-chip delayed C/A code) shifted from the predetermined code by an interval (½ chip) smaller than one chip in opposite directions (plus and minus); and the circuit further comprises a switch part (101, 102 and 103) switching so that the first correlation detects part (34, 39) detecting a correlation between the first fraction-shifted code (-½-chip delayed C/A code) and the first code (I-signal), and the second correlation detecting part (36, 41) detects a correlation between the second fraction-shifted code (+½-chip delayed C/A code) and the first code (I-signal).

A GPS receiving apparatus according to the present invention includes:

a receiving unit (4) extracting C/A codes from given GPS signals, and outputting data according to time difference between the different C/A codes; and an information processing device (5), according to the output data of the receiving unit, obtaining position information, wherein the receiving unit synchronizes a predetermined code with first and second codes different in phase derived from each of the GPS signals, comprises:

a code generating part (31') outputting phase-shifted code shifted in phase by a predetermined number of chips from the predetermined code;

a first correlation detecting part (34, 39) detecting a correlation between the phase-shifted code from the code generating part and the first code;

a second correlation detecting part (36, 41) detecting a correlation between the phase-shifted code from the code generating part and the second code; and a code shifting part (13) shifting the phase of the phase-shifted code from the code generating part by a predetermined number of chips according to the detection results of the first and second correlation detecting parts.

Thereby, by detecting the correlation using not only the predetermined code (0-chip delayed C/A code) but also the phase-shifted code (-1-chip delayed C/A code) shifted by an integral number of chips for search operation, it is possible to reduce the number of times of code shifting needed for the search operation. Accordingly, it is possible to render high-speed synchronization of the predetermined code to the given codes (I-signal and Q-signal).

Other objects and further features of the present invention will become more apparent from the following detailed description when read in conjunction with the accompanying drawings.

DETAILED DESCRIPTION OF THE PREFERRED EMBODIMENT

An embodiment of the present invention will now be described with reference to figures.

Figure 1:
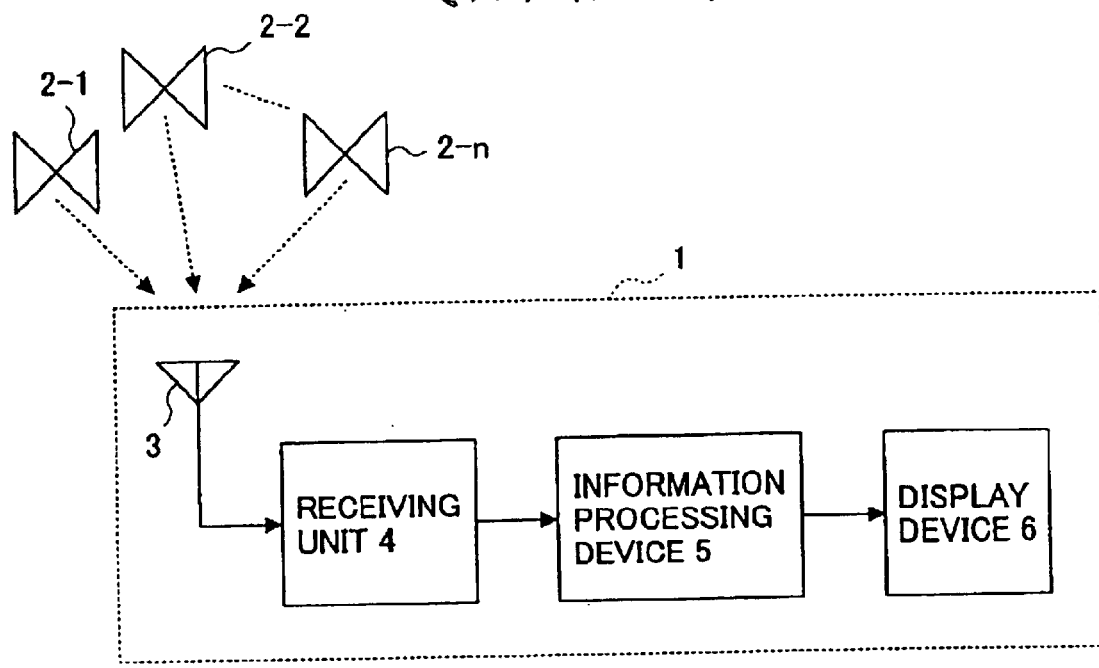
FIG. 1 shows a block configuration of one exmaple of a GPS receiving apparatus in the related art.
Figure 2:
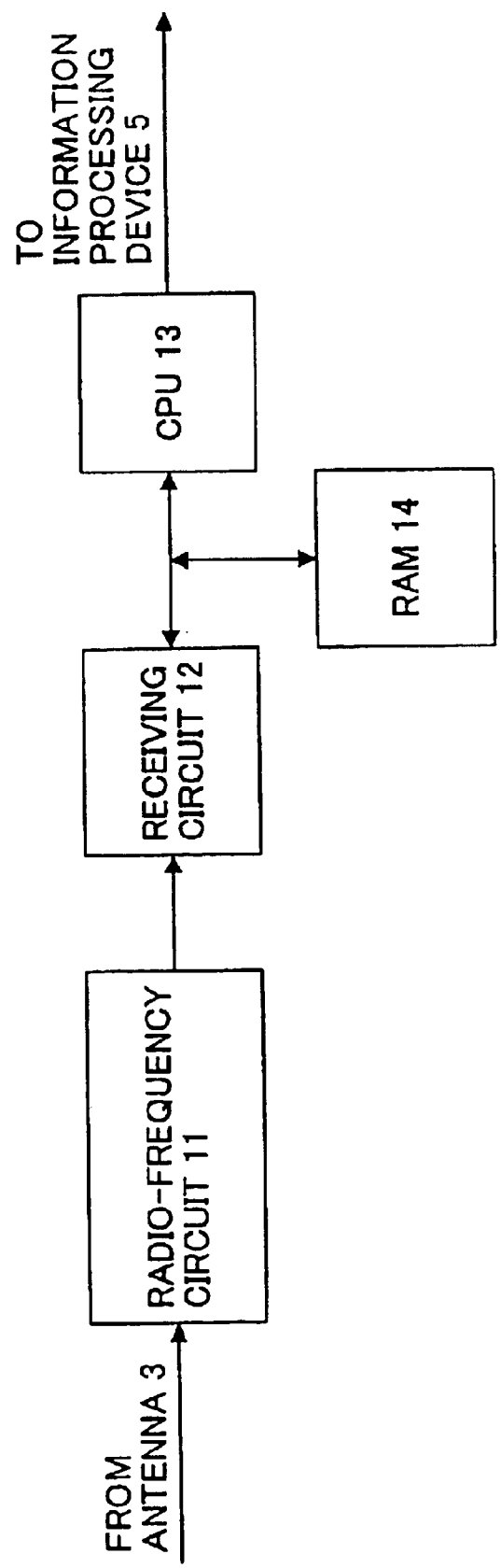
FIG. 2 shows a block configuration of a receiving unit shown in FIG. 1.
Figure 3:
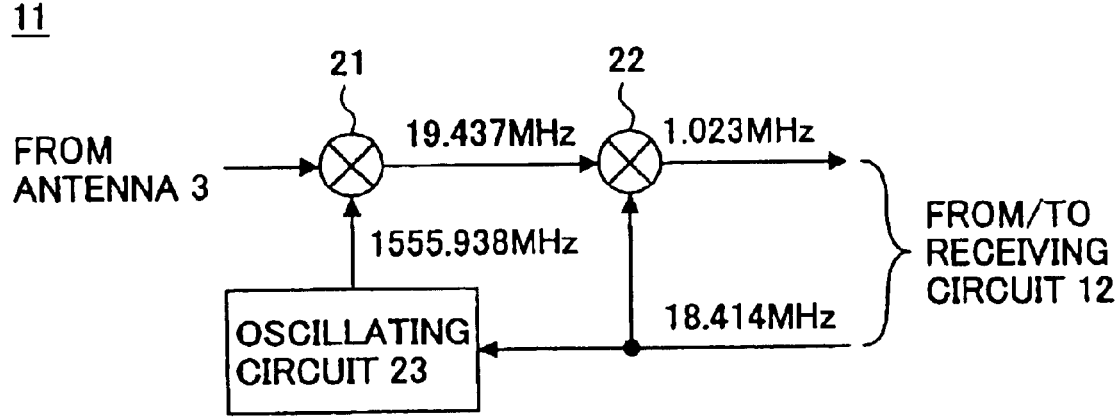
FIG. 3 shows a block configuration of a radio-frequency circuit shown in FIG. 2.
Figure 4:
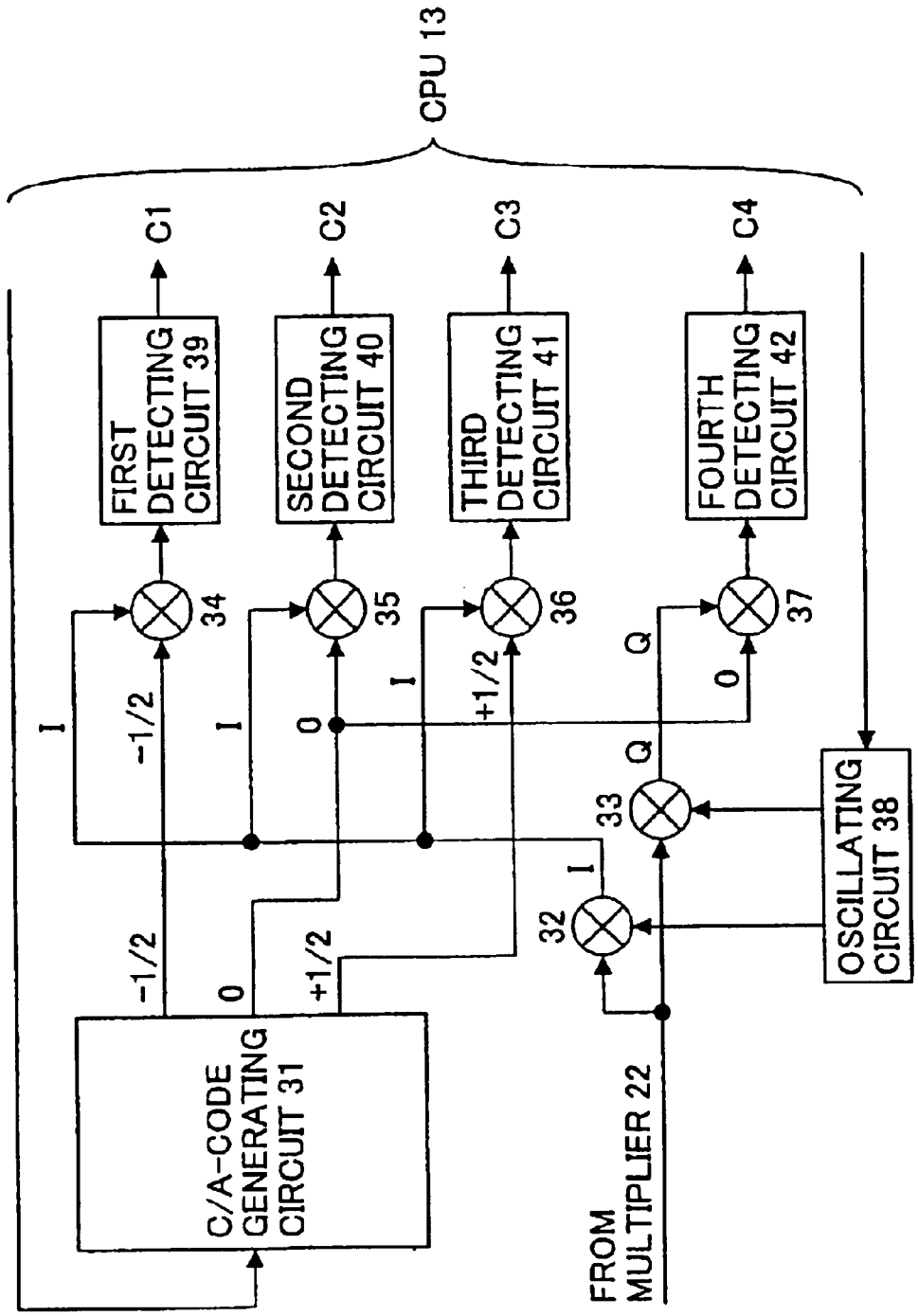
FIG. 4 shows a block configuration of a receiving circuit shown in FIG. 2.
Figure 5:
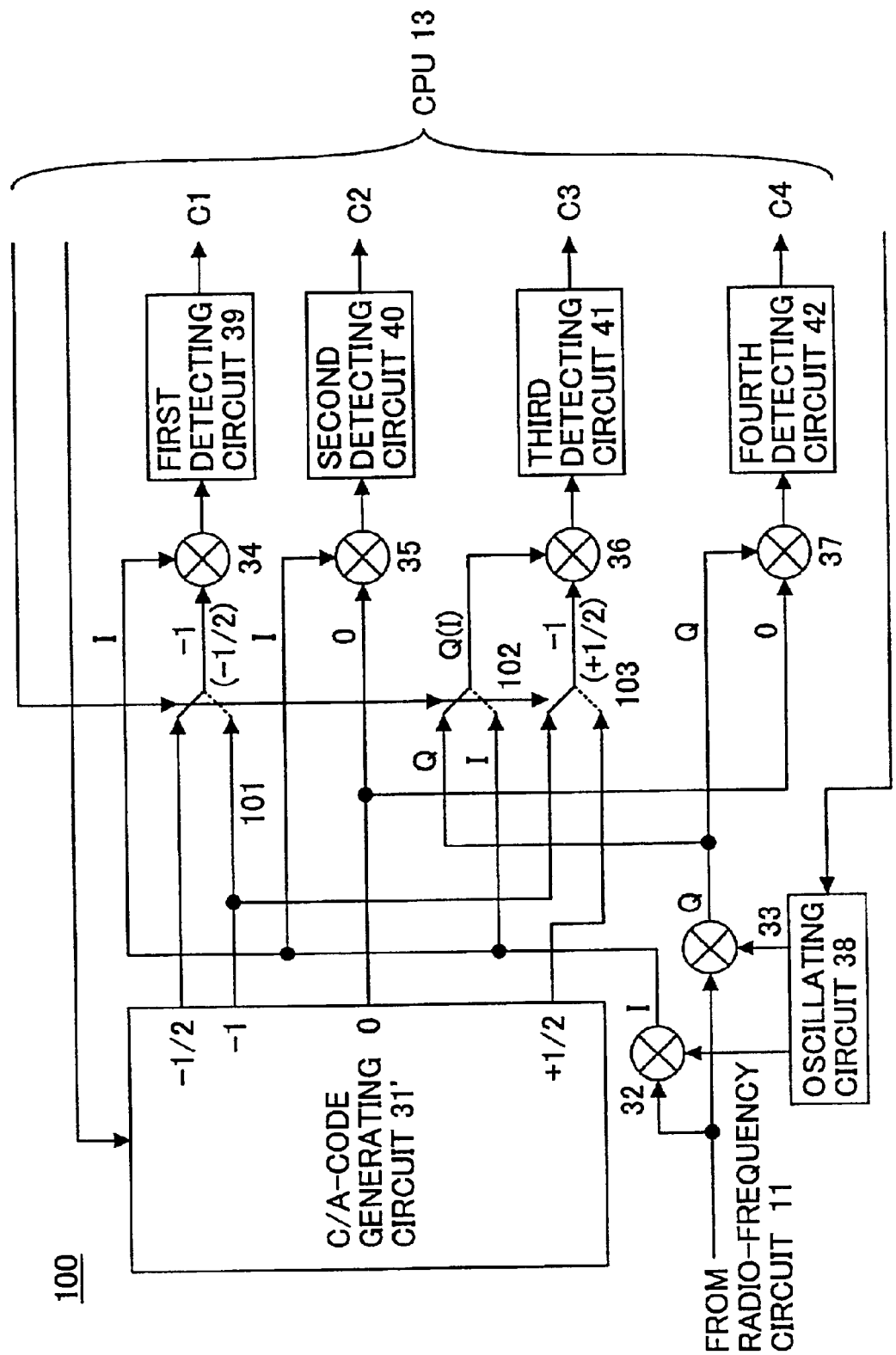
FIG. 5 shows a block configuration of a receiving circuit in one embodiment of the present invention.

FIG. 5 shows a block configuration of a receiving circuit (corresponding to the receiving circuit 12 in the related art shown in FIG. 4) of the embodiment of the present invention. In FIG. 5, the same reference numerals are give to the parts/components same as those in FIG. 4, and description thereof is omitted. Further, a GPS receiving apparatus according to the present invention is similar to the GPS receiving apparatus in the related art described above with reference to FIGS. 1 through 3, but the receiving circuit is changed from the receiving circuit 12 described above with reference to FIG. 4 into the receiving circuit 100 which will now be described with reference 5.

The receiving circuit 100 of the embodiment of the present invention is different from the receiving circuit 12 described above by the following points: the C/A codes output from the C/A-code generating circuit 31' (corresponding to the above-described C/A-code generating circuit 31) are four types thereof, and, also, three switches 101, 102 and 103 are newly provided.

The C/A-code generating circuit 31' generates, in addition to the -½-chip delayed C/A code, 0-chip delayed C/A code and +½-chip delayed C/A code, -1-chip delayed C/A code delayed from the 0-chip delayed C/A code by one chip.

The -½-chip delayed C/A code and -1-chip delayed C/A code are provided to the switch 101 from the C/A-code generating circuit 31'. The switch 101 selects either the -½-chip delayed C/A code or -1-chip delayed C/A code according to a switching control signal from the CPU 13, and provides the thus-selected code to the multiplier 34.

The multiplication result of the multiplier 32 and the multiplication result of the multiplier 33 are provided to the switch 102. The switch 102 selects either the multiplication result of the multiplier 32 or the multiplication result of the multiplier 33 according to a switching control signal from the CPU 13, and provides the thus-selected one to the multiplier 36.

The +½-chip delayed C/A code and -1-chip delayed C/A code are provided to the switch 103 from the C/A-code generating circuit 31'. The switch 103 selects either the +½-chip delayed C/A code or -1-chip delayed C/A code according to a switching control signal from the CPU 13, and provides the thus-selected code to the multiplier 36.

Operation of this embodiment of the present invention will now be described.

Figure 6:
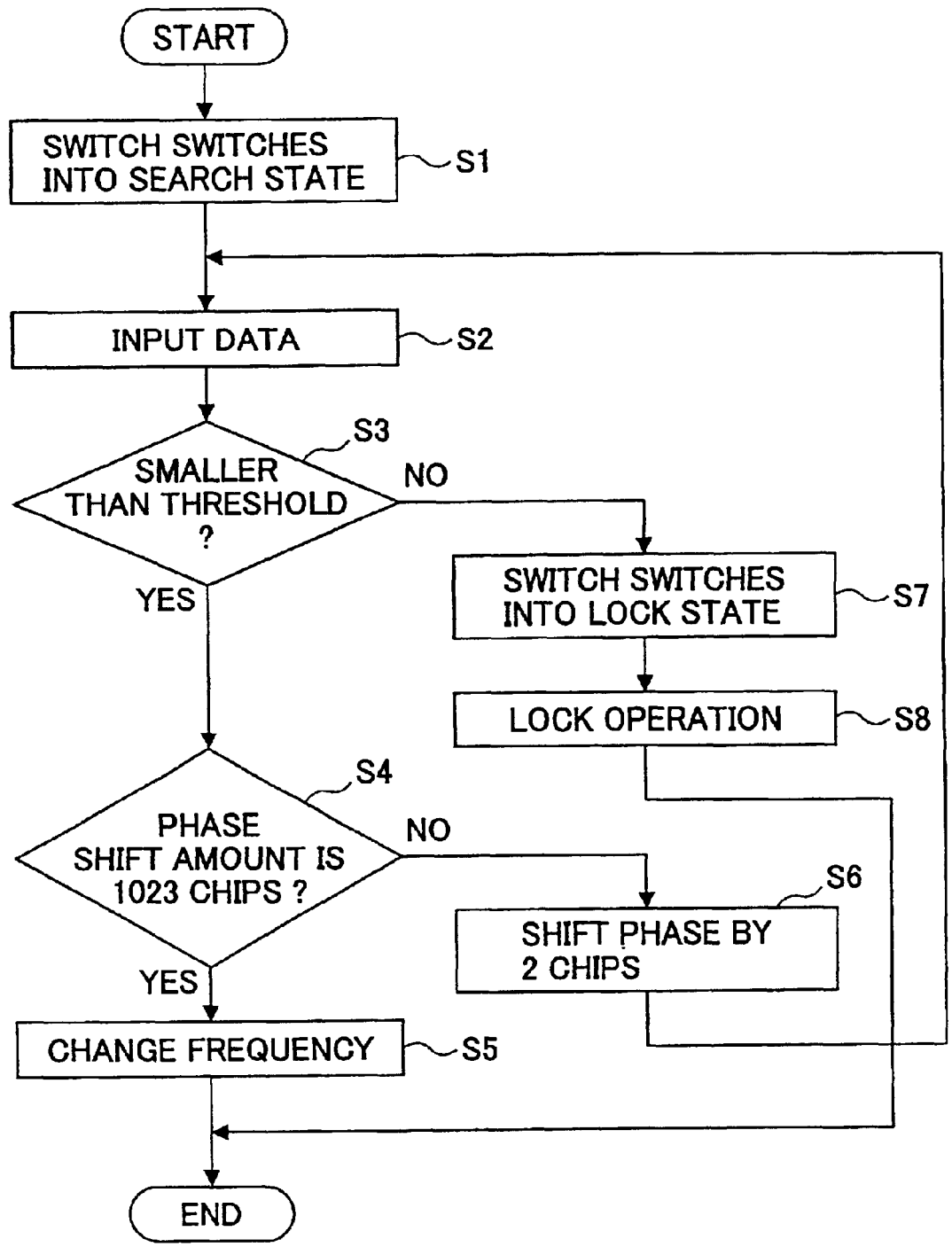
FIG. 6 shows a flow chart of operation rendered by a CPU in the first embodiment of the present invention.

FIG. 6 shows an operation flow chart of the CPU 13 of the embodiment of the present invention.

The CPU 13 executes steps S1 through S8.

In the step S1, the switches 101 through 103 are switched into states for search operation. In the search operation, the switch 101 is switched so that the -1-chip delayed C/A code from the C/A-code generating circuit 31' is provided to the multiplier 34. Further, the switch 102 is switched so that the Q-signal from the multiplier 33 is provided to the multiplier 36. The switch 103 is switched so that the -1-chip delayed C/A code from the C/A-code generating circuit 31' is provided to the multiplier 36.

Then, the step S2 is executed. In the step S2, the count values C1 through C4 are input from the first through fourth detecting circuit 39 through 42 to the CPU 13.

The CPU 13 obtains a correlation d0 and a correlation d10 from the count values C1 through C4 input in the step S2.

The correlation d10 is obtained from the count value C1 from the first detecting circuit 39 and the count value C3 from through third detecting circuit 41.

First, from the count values C1 and C3, the correlation values b1 and b3 are obtained by the above-mentioned formulas (1) and (3). Then, from the correlation values b1 and b3, the correlation d10 is obtained by the following formula (6):

$$d10=(b1^2+b3^2) \qquad (6)$$

The correlation d0 is obtained from the count value C2 from the second detecting circuit 40 and the count value C4 from through fourth detecting circuit 42.

First, from the count values C2 and C4, the correlation values b2 and b4 are obtained by the above-mentioned formulas (2) and (4). Then, from the correlation values b2 and b4, the correlation d0 is obtained by the above-mentioned formula (5).

The correlation d10 corresponds to a correlation between the −1-chip delayed C/A code and the I-signal and a correlation between the −1-chip delayed C/A code and the Q-signal. The correlation d0 corresponds to a correlation between the 0-chip delayed C/A code and the I-signal and a correlation between the 0-chip delayed C/A code and the Q-signal.

After obtaining the correlations d0 and d10 in the step S2, the CPU 13 executes the step S3. In the step S3, the CPU 13 determines whether or not the correlations d0 and d10 are larger than a threshold. When the correlations d0 and d10 are smaller than the threshold, the step S4 is executed.

In the step S4, it is determined whether or not the phase shift amount of the C/A codes output from the C/A-code generating circuit 31' is such that shift has been rendered for 1023 chips equal to all the chips of the C/A code. When it is determined in the step S4 that the chip shift of 1023 chips has been rendered, it can be determined that the multiplication results of the multipliers 32 and 33 have an error. Accordingly, the CPU 13 controls the frequency of the oscillation signal provided to the multipliers 32 and 33 from the oscillating circuit 38. After thus changing the frequency in the step S4, the process is returned to the step S1, and the search operation is performed again.

Further, when the shift amount of the C/A codes has not reached 1023 chips in the step S4, the step S6 is executed. In the step S6, a shift control signal is provided to the C/A-code generating circuit 31', and the C/A codes generated from the C/A-code generating circuit 31' are shifted by 2 chips. After the C/A codes are shifted in the step S6, the process is returned to the step S2, and the operation is continued.

When the correlations d0 and d10 are equal to or larger than the threshold, it can be determined that the lock (phase lock) operation can be rendered, and, therefore, the step S7 is executed.

In the step S7, the switches 101 through 103 are switched to states for the lock operation.

The switch 101 is switched so that the −½-chip delayed C/A code is provided to the multiplier 34 from the C/A-code generating circuit 31'. The switch 102 is switched so that the multiplication result of the multiplier 32 is provided to the multiplier 36. The switch 103 is switched so that the +½-chip delayed C/A code from the C/A-code generating circuit 31' is provided to the multiplier 36.

Thereby, the count value C1 output from the first detecting circuit 39 is a correlation value between the I-signal and −½-chip delayed C/A code. The count value C2 output from the second detecting circuit 40 is a correlation value between the I-signal and 0-chip delayed C/A code. The count value C3 output from the third detecting circuit 41 is a correlation value between the I-signal and +½-chip delayed C/A code. The count value C4 output from the fourth detecting circuit 42 is a correlation value between the Q-signal and 0-chip delayed C/A code.

After the switches 101 through 103 are thus switched into the states for the lock operation, the lock operation is performed in the step S8.

In the lock operation, the CPU 13 obtains the correlation value b2 and b4 from the count value C2 from the second detecting circuit 40 and the count value C4 from the fourth detecting circuit 42 by the formulas (2) and (4), obtains the correlation d0 by the formula (5), controls the oscillating circuit 38 so that the correlation d0 becomes not larger than a threshold, and locks the frequency. At this time, control is rendered such that the correlation value b4 becomes smaller and the correlation value b2 becomes larger.

Further, the CPU 13 obtains the correlation value b1 and b3 from the count value C1 from the first detecting circuit 39 and the count value C3 from the third detecting circuit 41 by the formulas (1) and (3), obtains the correlation d10 by the formula (6), controls the C/A-code generating circuit 31' so that the correlation d10 becomes not larger than a threshold, and locks the phase. At this time, control is rendered such that the difference between the correlation values b1 and b3 becomes smaller.

According to the present invention, the correlation between the −1-chip delayed C/A code and the I-signal and the correlation between the −1-chip delayed C/A code and the Q-signal, and, also, the correlation between the 0-chip delayed C/A code and the I-signal and the correlation between the 0-chip delayed C/A code and the Q-signal are obtained, and are utilized in the search operation. Thereby, it is possible to render the search for two chips at once. Accordingly, it is possible to render the search at a speed twice that of the related art, and to perform the search at high speed.

At this time, the configuration of the C/A-code generating circuit 31' needs to output −1-chip delayed C/A code additionally in comparison to the related art. Accordingly, increase in circuit scale is within a small amount. Further, by adding the switches 101 through 103, it is possible to render the lock operation similarly to that in the related art.

The switches 101 through 103 may be built in the C/A-code generating circuit 31' integrally.

The present invention is not limited to the above-described embodiment, and variations and modifications may be made without departing from the scope of the present invention.

The present application is based on Japanese priority application No. 2000-25771, filed on Feb. 2, 2000, the entire contents of which are hereby incorporated by reference.

What is claimed is:

1. A synchronizing circuit synchronizing a predetermined code with first and second codes different in phase by ½ chips, comprising:

a code generating part generating a 0 chip delayed C/A code, a ½ chip delayed C/A code, a −½ chip delayed C/A code and a −1 chip delayed C/A code;

a first switching part receiving the −½ chip delayed C/A code and the −1 chip delayed C/A code, and selectively outputting one thereof;

a second switching part receiving the first and second codes, and selectively outputting one thereof;

a third switching part receiving the −1 chip delayed C/A code and the ½ chip delayed C/A code, and selectively outputting one thereof;

a first correlation detecting part detecting a correlation between the output of said first switching part and the first code;

a second correlation detecting part detecting a correlation between the 0 chip delayed C/A code and the first code;

a third correlation detecting part detecting a correlation between the output of said second switching part and the output of said third switching part; and a fourth correlation detecting part detecting a correlation between the second code and the 0 chip delayed C/A code, wherein:

when search operation is performed, said first switching part outputs the −1 chip delayed C/A code; said first correlation detecting part detects a correlation between the first code and the −1 chip delayed C/A code; said second switching part outputs the second code and said third switching part outputs the −1 chip delayed C/A code; and said third correlation detecting part detects a correlation between the second code and the −1 chip delayed C/A code; while, when locking operation is performed, said first switching part outputs the −½ chip delayed C/A code; said first correlation detecting part detects a correlation between the first code and the −½ chip delayed C/A code; said second switching part outputs the first code and said third switching part outputs the ½ chip delayed C/A code; and said third correlation detecting part detects a correlation between the first code and the ½ chip delayed C/A code.

2. A GPS receiving apparatus comprising:

a receiving unit extracting C/A codes from given GPS signals, and outputting data according to time difference between the different C/A codes; and an information processing device, according to the output data of the receiving unit, obtaining position information, wherein:

said receiving unit comprises the synchronizing circuit claimed in claim 1 and a code shifting pert shifting the phase of the chip delayed C/A codes from the code generating part by a predetermined number of chips according to the detection results of said first and third correlation detecting parts.

\* \* \* \* \*